United States Patent

Jenkins et al.

Patent Number: 5,824,401
Date of Patent: Oct. 20, 1998

[54] OIL-BARRIER WATERPROOFING MEMBRANCE LAMINATE

[75] Inventors: Robert Francis Jenkins, Wakefield; Robert Alan Wiercinski, Lincoln, both of Mass.

[73] Assignee: W.R. Grace & Co.-Conn., New York, N.Y.

[21] Appl. No.: 949,209

[22] Filed: Oct. 10, 1997

Related U.S. Application Data

[63] Continuation of Ser. No. 314,171, Sep. 28, 1994, abandoned.

[51] Int. Cl.$^6$ .............................. B32B 7/10; B32B 11/04; B32B 27/08; B32B 27/32

[52] U.S. Cl. .................... 428/215; 428/323; 428/328; 428/330; 428/339; 428/343; 428/355 R; 428/474.4; 428/475.8; 428/476.1; 428/476.3; 428/476.9; 428/480; 428/483; 428/489; 428/515; 428/516; 428/518; 428/520; 428/522; 428/523

[58] Field of Search ................... 428/36.6, 36.7, 428/323, 328, 330, 475.8, 476.1, 474.4, 480, 483, 489, 516, 910, 339, 343, 355 R, 476.3, 476.9, 515, 518, 520, 522, 523, 215

[56] References Cited

U.S. PATENT DOCUMENTS

| | | | |
|---|---|---|---|
| 3,581,779 | 6/1971 | Sylvia, Jr. | 138/141 |
| 3,591,248 | 7/1971 | Jurnet et al. | 350/1 |
| 3,741,856 | 6/1973 | Hurst | 161/88 |
| 4,323,613 | 4/1982 | Snyder | 428/111 |
| 4,396,665 | 8/1983 | Rowe | 428/148 |
| 4,442,148 | 4/1984 | Stierli | 428/40 |
| 4,457,983 | 7/1984 | Maile et al. | 428/213 |
| 4,595,636 | 6/1986 | Wiercinski et al. | 428/489 |
| 4,600,635 | 7/1986 | Wiercinski et al. | 428/220 |
| 4,670,071 | 6/1987 | Cooper et al. | 156/71 |
| 4,992,334 | 2/1991 | Kindt et al. | 428/489 |
| 4,994,328 | 2/1991 | Cogliano et al. | 428/489 |

FOREIGN PATENT DOCUMENTS

| | | |
|---|---|---|
| 2212417 | 7/1969 | United Kingdom . |
| 2 212 417 | 7/1989 | United Kingdom . |

OTHER PUBLICATIONS

MFM Building Products Corp., "Peel & Seal™ ", 9 pages (belived to be before Sep. 1994).

MFM Building Products Corp., "Finish Low Slope Roofs and make quick waterproof repairs", 10 pages, (believed to be before Sep. 1994).

MFM Building Products Corp., "The MFM family of self–adhering waterproofing products and addessories", 26 pages (believed to be before Sep. 1994).

*Primary Examiner*—Paul J. Thibodeau
*Assistant Examiner*—Vivian Chen
*Attorney, Agent, or Firm*—Craig K. Leon; William L. Baker

[57] ABSTRACT

A oil barrier waterproofing membrane laminate for waterproofing structural surfaces comprises a bituminous rubber adhesive membrane containing oil wherein on one face of the bituminous membrane is a carrier support structure comprising at least three polymeric layers. The carrier comprises an innermost light-absorbing polyethylene film containing carbon black situated closest to the bituminous membrane; an outermost surface layer comprising a light-reflecting polyethylene film containing a light-reflecting pigment; and at least one oil barrier film situated between the light-absorbing and light-reflecting polyethylene films.

11 Claims, 1 Drawing Sheet the issues just discussed above. For example, U.S. Pat. No.

OIL-BARRIER WATERPROOFING MEMBRANCE LAMINATE

This is a continuation of application Ser. No. 08/314,171, filed on Sep. 28, 1994, abandoned.

FIELD OF THE INVENTION

This invention relates to waterproofing materials which are in the form of preformed, sheet-like laminates of (a) a waterproof and waterproofing bituminous membrane adhered to (b) a support sheet material covering at least one major surface of the bituminous membrane.

BACKGROUND OF THE INVENTION

It is known that building surfaces, such as foundations, concrete decks, roofs, and the like, can be sealed in a waterproof manner by formation thereon of a continuous membrane of a bituminous composition that is substantially impermeable to moisture. The term "bituminous composition" as used in the present disclosure refers to compositions based on tar, asphalt or pitch with or without added components. Historically, such waterproofing membranes were formed by "in situ" application of a bituminous composition, along with one or more "plys" of bitumen-saturated felts. One disadvantage of this procedure is that the formation of a layer of waterproofing sealant at the job site was dependent upon uniform application. Such application caused additional expenses of labor at the job site. Moreover, vertical substructural membranes were often unmanageable.

In more recent times, waterproofing of structural surfaces was done by using preformed, flexible membranes of bituminous compositions that were pressure-sensitive. These waterproofing materials had a laminate structure comprising a support sheet, such as a polymer film, adhered to a membrane of a flexible self-adhesive bituminous composition superimposed on the support sheet. As taught in Canadian Pat. No. 1,008,738 of Davis, it was known to employ in the support sheet a cross-laminated or biaxially-oriented synthetic polymeric film to avoid wrinkling after exposure to outdoor sunlight.

In some applications, it is necessary to provide a reflective surface to minimise temperature gain due to solar exposure. While pigments could be incorporated into the polymer film, it was taught by Martin in GB 2,212,417 that this rendered the film tearable during the stretching operation which is part of the manufacturing process in the making of oriented films. Accordingly, Martin taught the use of a pigmented polymer layer which is coated onto the support sheet material by extrusion coating. The use of the pigmented polymer imparted a light color to the waterproofing laminate, so as to keep it cooler and reduce the temperature elevation in sunlight.

In addressing the issue of solar heating, it is one purpose of the present invention to minimize the number of manufacturing steps required to provide a pre-formed waterproofing laminate membrane. Thus, the present invention is directed to membrane systems wherein a reflecting pigment coating is not separately coated in the process of forming the laminate membrane structure.

Moreover, reflective pigments, which appear white or whitish in color, are sometimes discolored due to the migration of oils from the bituminous rubber adhesive layer. The use of oil-barrier layers in waterproofing laminate membranes is known, and can be referred to with respect to the issues just discussed above. For example, U.S. Pat. No. 4,396,665 of Rowe and No. 4,585,682 of Colarusso et al. teach the use of a thin layer of metal film to prevent migration of oils in the bitumen adhesive composition layer from reaching an uppermost polymeric support film. However, the use of the metal film is expensive, and presents thermal expansion issues which must be considered.

Canadian Patent No. 1,145,109 of Hurst disclosed an oil-resistant polymer coating applied in liquid form between a first layer of bituminous self-adhesive composition and a second layer of bituminous composition which was substantially non-adhesive. The oil barrier coating prevented oil from one of the bituminous layers from migrating to the other layer. Along these lines, U.S. Pat. No. 4,442,148 of Stierli taught the use of an oil barrier coating layer, but one which was located between the polymeric carrier sheet and contiguous bituminous adhesive layer.

While an oil barrier film or coating material can indeed be employed within a multilayer waterproofing membrane composite to prevent discoloration of a white or whitish pigment, and in extreme cases to prevent bleeding-through of oil migrating from the bituminous adhesive layer, there is still the further problem of providing a laminate which can be assembled in a convenient, efficient, and cost-saving manner. It is desired herein to obtain a novel laminate which retains the kind of flexibility and manageability that might not be otherwise obtained through an excessively multi-layered or multi-coated structure, but which provides the desired durability in the face of rough job site demands, sunlight, and the elements.

SUMMARY OF THE INVENTION

It is a purpose of the present invention to integrate in an effective, convenient, and cost-saving manner certain diverse properties, such as light-reflectivity to minimize thermal gain from sunlight, light absorptivity to minimize light transmission to the bituminous layer, and oil-barrier properties to prevent migration of oils which would stain a light reflective outer layer which is usually white or whitish in color.

As will be further described herein, the present invention is directed to providing novel laminates in which an oil-barrier layer is used in conjunction with an incorporated additive that provides light reflectivity; and, according to the invention, one of the purposes is to provide both of these features in the same step so that they do not need to be separately applied. In still further embodiments of the invention, an additive for blocking the transmission of light (including ultraviolet light), such as carbon black, is further incorporated in a layer beneath the outermost layer which incorporates the light-reflective additive as just described.

In an exemplary embodiment of the invention, a rollable, pre-formed membrane laminate for waterproofing structural surfaces, comprises a flexible waterproof and waterproofing self-adhesive bituminous membrane layer having oil therein: and a polymeric support carrier sheet non-removably adhered to the bituminous membrane layer, the carrier sheet comprising a first polymeric layer, a second polymeric layer that is laminated to the first layer and is co-extensive therewith, the first layer comprising an additive that is operative to reflect light, the second layer being located between the first layer and bituminous membrane layer, and at least one polymeric film operative as an oil-resistant and oil-impermeable barrier located between the carrier sheet first layer and the bituminous membrane layer, the oil-resistant polymeric film being co-extensive with the first and second carrier sheet layers by virtue of being co-extruded with at least one of them.

An exemplary method of the invention for fabricating a rollable waterproofing membrane laminate comprises the steps of: providing a carrier support sheet assembly by providing a first polymer film incorporating an additive operative to reflect light, laminating said first film to a second film; providing at least one oil-resistant and oil-impermeable polymeric film by coextruding said oil-resistant and oil-impermeable polymeric film with at least one of said first and second carrier support sheet layers; and providing a waterproof and waterproofing bituminous layer whereby said bituminous layer is non-removably attached to said carrier support sheet assembly on a side opposite said first polymer film which incorporates said light reflecting additive.

Further exemplary laminates and methods are discribed with further particularity hereinafter.

DETAILED DESCRIPTION OF EXEMPLARY EMBODIMENT

Figure 1:
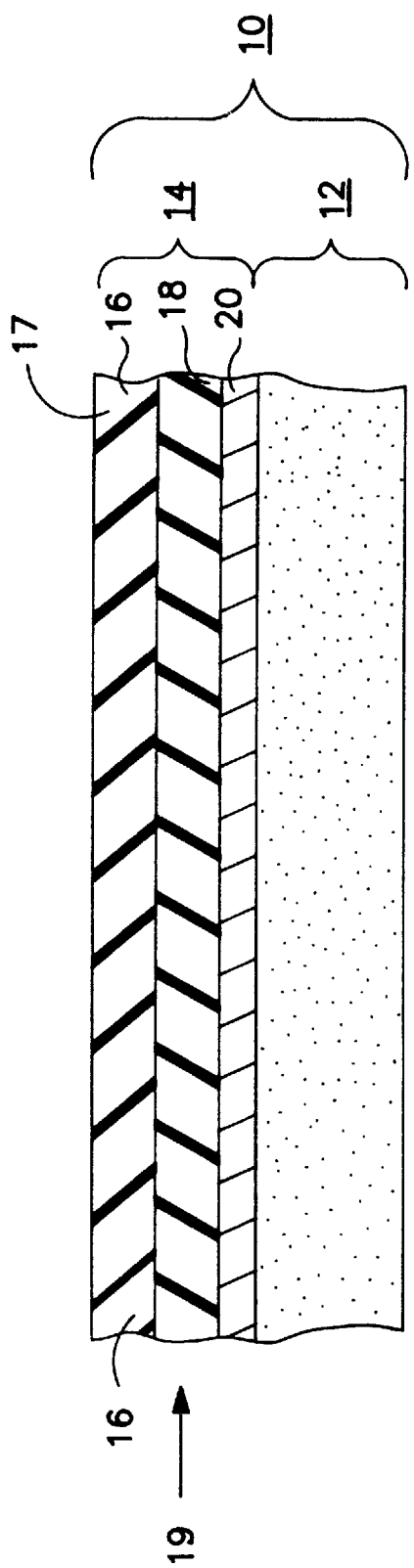
FIG. 1 is a graphical illustration along a cross section of an exemplary bituminous waterproofing membrane laminate of the invention.

As shown in FIG. 1, an exemplary waterproofing membrane laminate 10 of the invention comprises a self-adhesive, or pressure-sensitive, bituminous composition layer 12 which is generally contiguous with and non-removably adhered to a carrier support sheet assembly or structure 14. By the term "non-removably adhered," it is meant that the bituminous layer 12 cannot be removed from the carrier sheet assembly 14 without destroying the integrity of the bituminous layer 12.

The bituminous adhesive composition 12 comprises a mixture of (a) a bituminous material and (b) natural or synthetic polymer, preferably a rubber or other elastomer polymer. The term "bituminous material" as used herein includes compositions containing asphalt, tar such as coal tar, or pitch. The bituminous adhesive may be reinforced with fibers and/or particulate fillers. In addition to any oils normally present in the bitumen, the adhesive composition may also contain a conventional extender component such as an aromatic oil. As aforementioned, the preferred polymer component is rubber which may be virgin rubber or a synthetic rubber (e.g., SBS, SBR) blended into the bitumen, and preferably extender oil at an elevated temperature, to form a smooth mix.

The bituminous adhesive layer 12, at least at its surface remote from the carrier support sheet 14 is, as mentioned, preferably pressure-sensitive and tacky at normal ambient temperature in order that it be self-adhesive to the substrate surface (e.g., foundation, concrete deck, roof). The bituminous layer 12 serves to form a continuous waterproofing layer which is elastic and self-sealing against punctures at high and low temperature. Preferably, the thickness of the bituminous layer 12 is in the range of 10 to 200 mils thick, and more preferably is about 30 to 60 mils thickness.

The support carrier sheet assembly or structure 14 serves as a strength imparting and supporting member within the laminate 10 and as a barrier to prevent moisture vapor transmission through the laminate. Preferably, the thickness of the carrier sheet assembly 14 is less than that of the bituminous waterproofing adhesive layer 12. However, the carrier sheet assembly 14 should be of sufficient thickness to impart tear- and puncture-resistance to the laminate 10. The carrier sheet assembly 14 should preferably have a thickness of about 1 to 50 mils (0.001 to 0.050 inches).

The carrier sheet assembly 14 comprises a first polymeric layer 16 and a second polymeric layer 18 which may be laminated to this first layer 16. The dimensional stability of these two layers 16 and 18 can be, and are typically, adversely affected by oils present in the bituminous membrane 12, especially when the laminate 10 is exposed to elevated temperatures as may be experienced in roof top environments. The first and second layers 16 and 18 may be comprised of a polyolefin film such as polyethylene, and the film may be uniaxially oriented, biaxially-oriented or cross laminated, as is known in the art.

In the present invention, the first carrier sheet layer 16, which is located on the side of the second carrier sheet layer 18 opposite the bituminous layer 12, further comprises at least one additive operative to reflect visible light. Preferably, the additive 17 imparts a white or whitish color to the first polymeric layer 16. The additive can be selected from the group consisting of titanium dioxide, calcium carbonate, and zinc oxide. Titanium dioxide is preferred.

At least one oil-resistant and oil-impermeable synthetic polymer layer 20, as may be known in the art, is located between the first layer 16 and bituminous layer 12. In a preferred method for making the second polymer layer 18, at least one oil-impermeable synthetic polymer layer film 20 is co-extruded with the second polymeric layer 18. If only one oil-impermeable polymeric layer 20 is co-extruded with the second polymer layer 18, the oil-barrier layer 20 side can be positioned such that it is located between the first 16 and 18 carrier sheet layers or between the two layers 16/18 and the bituminous layer 12. In another embodiment, the oil-impermeable polymeric layer 20 can be co-extruded with the first layer 16, and positioned such that it resides between the two polymeric carrier layers 16 and 18 when they are laminated together.

In another exemplary embodiment, at least one oil-impermeable barrier film layer 20 can be co-extruded with each of the two carrier sheet layers 16 and 18. A number of possibilities are envisioned, and each is contemplated within the scope of the present invention. Thus, a carrier sheet structure 14 can have an oil-impermeable barrier or layer 20 located between each of the layers 16, 18, and 12 by coextruding an oil-impermeable film layer with each of said first 16 and second 18 polymer layers, or by co-extruding an oil-impermeable layer on the opposing sides of the second polymer carrier layer 18.

In further exemplary embodiments, an oil-barrier film 20 can be extruded on each of the first 16 and second 18 polymeric film layers and located on opposing sides of those two layers 16/18. One or more oil-barrier film layers 20 can, of course, be located between the first 16 and second 18 polymer layers. Further exemplary embodiments comprise an oil barrier film layer 20 located on both sides of each of the first and second polymer sheet layers 16 and 18. The advantage of locating one or more oil-impermeable layers 20 in a symmetrical fashion within the carrier sheet assembly 14 is to increase dimensional stability over time.

The oil-resistant polymeric layer 20 can be any known polymeric material which is capable of acting as an oil passage barrier with respect to the support sheet member, and in particular the outer-most first polymeric layer 16. Suitable oil-resistant polymer layer 20 materials can comprise a material such as a polyamide, a polyethylene terephthalate, a polyvinyl acetate, a polyvinylidene chloride, and other co-extrudable film materials that might be known in the film packaging arts. The polymer 20 material can also contain additives to improve its properties.

In further exemplary embodiments, a light absorbing additive, as may be known in the coating arts, preferably such as carbon black, can be incorporated into the polymer which is extruded to form the polymeric support sheet layer 18 and/or any oil-impermeable barrier layer 20 located beneath the top first layer 16 and the bituminous layer 12. Accordingly, the first polymeric layer 16 contains a light reflective additive such as titanium dioxide, such that it reflects light and reduces solar thermal gain, while the second carrier sheet layer 18 and/or an oil-resistant barrier layer 20 (located such as adjacent the bituminous layer 12 and/or between the first polymer layer 16 and the bituminous layer 12) contains a light-absorptive material, such as carbon black, to minimize transmission of solar energy to the bituminous layer 12. The light-absorptive material 19 is operative to block visible or ultra-violet light from reaching the bituminous composition 12 when the waterproofing laminate 10 is installed on the substrate surface (not shown) to be protected.

The advantages of the novel selection and arrangement of components described herein is to lower thermal gain from sunlight, to improve thereby the dimensional characteristics of the laminate, especially in southern climates, and to eliminate the migration of oils, especially aromatic oils, into the film composite which would otherwise cause loss of reflectivity and have deleterious effects on dimensional stability. Furthermore, the solar effects on the bituminous compound are minimized due to decrease light transmissivity in the laminate.

Preferably, although not necessarily, where more than one oil-impermeable polymeric layer 20 is used, the support carrier assembly 14 should employ such layers in a symmetrical arrangement to minimize curling or other deformation due to the use of different materials in the first and second layers 16/18 and in the oil-impermeable polymeric layer 20. For example, the waterproofing membrane laminate 10 may contain a carrier sheet assembly 14 comprising first and second sheet layers 16 and 18, laminated together, each of which is formed by co-extruding between two polyethylene films an oil-impermeable polymeric film. A tie coat adhesive as will be known to those in the art may be used to adhere the two polyethylene layers co-extruded with the inner oil-impermeable layer.

A further advantage of the invention is to provide convenient and cost-effective methods for fabricating the waterproofing membrane laminate 10. Accordingly, one exemplary method for fabricating the waterproofing membrane laminate 10 comprises the steps of providing a carrier support sheet assembly 14 by providing a first polymer film 16 incorporating an additive 17 operative to reflect light, laminating said first film 16 to a second film 18 which is generally co-extensive with said first film 16; providing at least one oil-resistant and oil-impermeable polymeric film 20 by coextruding said polymeric film 20 with at least one of said first 16 and/or second 18 carrier support sheet layers; and providing a waterproof and waterproofing bituminous layer 12 whereby said bituminous layer is non-removably attached to said carrier support sheet assembly 14 on a side opposite said first polymer film 16 incorporating said light reflecting additive 17. The co-extrusion of said oil-impermeable layer is indeed of structural and process significance when one takes into account the extra sequentially necessitated step of otherwise laminating two separate layers together using a compatible adhesive. Further exemplary methods comprise the step of incorporating a light absorptive material 18, preferably carbon black, into either or both of said second carrier sheet layer 18 and/or at least one oil-impermeable layer 20, prior to extrusion of said layers 18/20.

A further exemplary method for fabricating a waterproofing membrane laminate comprises the steps of: coextruding together a first polymer layer, preferably comprised of polyethylene, said first layer incorporating a light reflective additive such as titanium dioxide, with a second polymer layer operative as an oil-resistant and oil-impermeable barrier, said barrier layer comprising a polyethylene terephthalate, a polyamide, a polyvinyl acetate, a polyvinylidene chloride, or mixture thereof, and said oil-impermeable layer further comprising carbon black; and providing thereupon a contiguous non-removably adhered waterproof and waterproofing bituminous adhesive layer.

As modifications and equivalents may appear evident to those skilled in the art in viewing the disclosure herein, the scope of the invention is not intended to be limited by any of the exemplary or preferred foregoing embodiments, which are provided for illustrative purposes only.

We claim:

1. An oil barrier waterproofing membrane laminate for waterproofing structural surfaces, comprising: a waterproofing membrane which is self-adherable to structural surfaces, said membrane having a first and second major face and comprising a bituminous rubber adhesive having oil; and, attached to one of said membrane faces, a continuous carrier support structure comprising at least three polymer films; a first polymer film thereof being located outermost with respect to said oil-containing membrane and comprising polyethylene and at least one light-reflective additive selected from the group consisting of titanium dioxide, calcium carbonate, and zinc oxide whereby said film is operative to reflect sunlight energy, a second polymer film thereof being located innermost with respect to said oil-containing membrane and comprising polyethylene and carbon black, whereby said innermost second polyethylene film is operative to absorb sunlight energy, and, interposed between said outermost first and innermost second polyethylene films, at least one oil-barrier film comprising a polymer selected from the group consisting of a polyamide, a polyethylene terephthalate, a polyvinyl acetate, and a polyvinylidene chloride.

2. The waterproofing membrane laminate of claim 1 comprising at least two oil-barrier films.

3. The waterproofing membrane laminate of claim 2 wherein said at least two oil-barrier films are located on either side of said innermost second polyethylene film.

4. The waterproofing membrane laminate of claim 1 wherein said outermost first polyethylene film comprises titanium dioxide.

5. The waterproofing membrane laminate of claim 1 wherein said bituminous rubber membrane further comprises a particulate filler.

6. The waterproofing membrane laminate of claim 1 wherein said bituminous membrane is self-sealing against punctures by nails.

7. The waterproofing membrane laminate of claim 1 wherein said at least one oil-barrier film is co-extruded with either said first or second polyethylene film.

8. The waterproofing membrane laminate of claim 1 wherein the location of said at least one oil-barrier film is symmetrical with respect to said first and second polyethylene films.

9. The waterproofing membrane laminate of claim 1 further comprising a tie adhesive located between at least two of said polymer films.

10. The waterproofing membrane laminate of claim 1 wherein said oil is an aromatic oil.

11. The waterproofing membrane laminate of claim 1 wherein said carrier support structure has a thickness of 1 to 50 mils.

* * * * *

UNITED STATES PATENT AND TRADEMARK OFFICE
CERTIFICATE OF CORRECTION

PATENT NO. : 5,824,401
DATED : October 20, 1998
INVENTOR(S) : Robert Francis Jenkins, et al It is certified that error appears in the above-identified patent and that said Letters Patent is hereby corrected as shown below:

On the title page, item [54] and column 1, line 2, "MEMBRANCE" should read --MEMBRANE--.

Signed and Sealed this

Sixteenth Day of February, 1999

Attest:

Attesting Officer

Acting Commissioner of Patents and Trademarks